R. N. MARTZ.
VEHICLE BRAKE.
APPLICATION FILED JULY 14, 1909.
963,608.
Patented July 5, 1910.
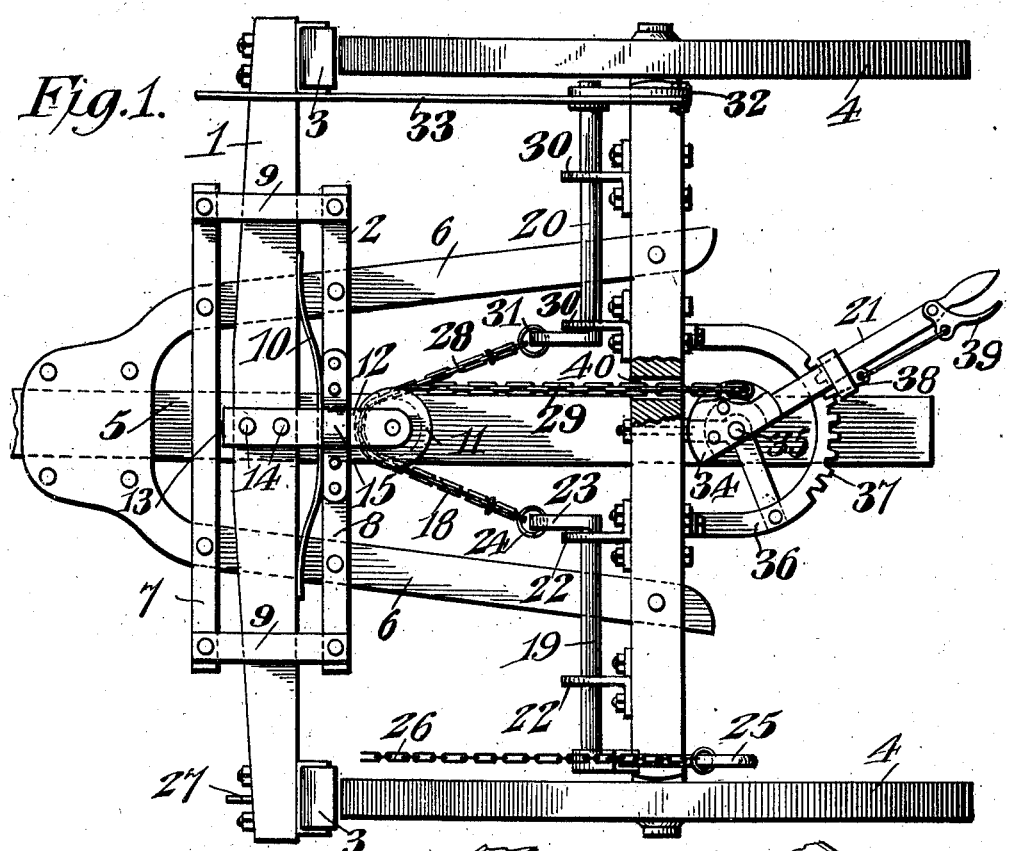
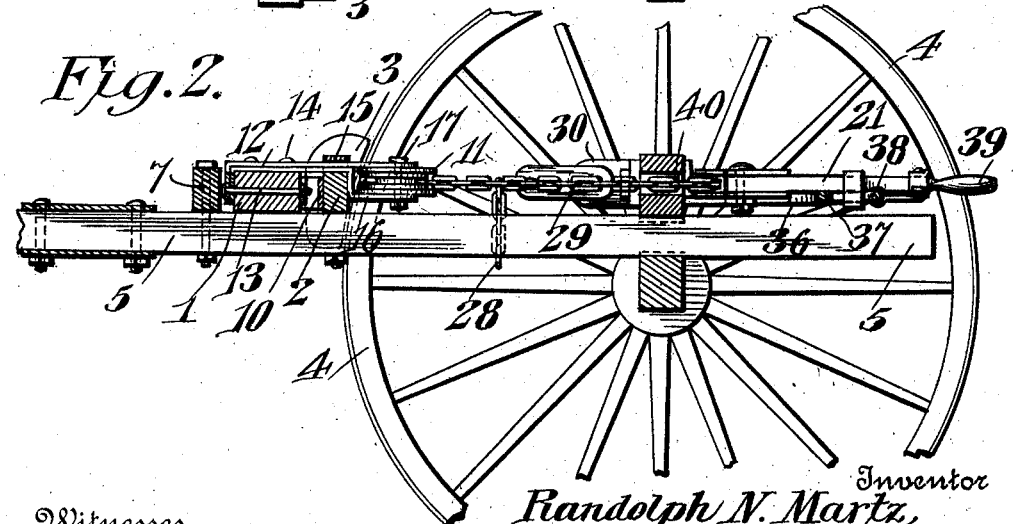
Witnesses
Jas. E. McCathran
H. T. Riley
Inventor
Randolph N. Martz,
By C. G. Siggers
Attorney

UNITED STATES PATENT OFFICE.

RANDOLPH N. MARTZ, OF FREDERICK, MARYLAND.

VEHICLE-BRAKE.

963,608.	Specification of Letters Patent.	Patented July 5, 1910.

Application filed July 14, 1909. Serial No. 507,545.

*To all whom it may concern:*

Be it known that I, RANDOLPH N. MARTZ, a citizen of the United States, residing at Frederick, in the county of Frederick and State of Maryland, have invented a new and useful Vehicle-Brake, of which the following is a specification.

The invention relates to improvements in vehicle brakes.

The object of the present invention is to improve the construction of vehicle brakes, and to provide a simple, inexpensive and efficient vehicle brake of great strength and durability, designed particularly for use on farm wagons and analogous vehicles, and capable of being readily applied from either the front, back or side of the vehicle with equal effectiveness.

A further object of the invention is to provide a vehicle brake of this character, adapted to be readily applied without change to different vehicles of a standard gage, and capable of ready adjustment to take up the wear on the brake shoes.

With these and other objects in view, the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing:—Figure 1 is a plan view of the rear portion of a running gear provided with a brake, constructed in accordance with this invention. Fig. 2 is a longitudinal sectional view of the same.

Like numerals of reference designate corresponding parts in all the figures of the drawings.

1 designates a brake beam, slidable bodily backwardly and forwardly in a guide frame 2 and equipped at its ends with suitable brake shoes 3, arranged to engage the hind wheels 4 in the usual manner. The brake beam extends across and is supported by the reach 5 and the rear hounds 6, and the guide frame is composed of front and rear transverse bars 7 and 8 and short upper and lower longitudinally disposed bars or plates 9. The front and rear transverse bars 7 and 8 are preferably constructed of wood, although they may be made of any suitable material, and the connecting end bars or plates 9, which are located above and below the brake beam 1, are preferably constructed of metal. The brake shoes are normally held off the hind wheels by means of a transversely disposed spring 10, centrally secured to the front face of the rear transverse bar 8 of the guide frame, and having its terminal portions extended forwardly and bearing against the rear edge of the brake beam. The spring 10 moves the brake beam forwardly and throws the brake shoes off the wheels when the brake is released and the brake bar is free to move forwardly.

The brake beam carries a centrally arranged horizontally disposed pulley 11, located in rear of the guide frame and mounted in a metallic bracket 12, preferably composed of two bars or strips having their front portions fitted together and extending across the upper face of the brake beam at the center thereof, and bent downward at the front edge of the same and secured thereto by a horizontal bolt 13. The bracket is also fastened to the brake beam by vertical bolts or rivets 14, but the front portion of the bracket may be mounted on the brake beam in any other preferred manner. The bracket extends through a guide 15 of the rear transverse bar 8 of the guide frame, and the lower bar or piece of the bracket is bent downwardly and rearwardly in rear of the guide frame to provide an approximately L-shaped supporting portion 16. The pulley 11 is pivoted by a vertical bolt 17 between the spaced rear portions of the bars or members of the bracket, and it receives a chain 18, extending around the front of the pulley and rearwardly at opposite sides thereof. The guide 15 consists of a metallic strap or plate, secured at its terminals to the upper edge of the rear transverse bar 8 of the guide frame and bowed upwardly at an intermediate point to extend over the stem of the bracket.

The chain 18 is connected at opposite sides of the vehicle with short transverse rock shafts 19 and 20, and at the back of the vehicle with a horizontally disposed operating lever 21. The rock shaft 19, which is journaled in spaced bearing brackets 22, is provided at its inner end with a short arm 23, which is connected by a split ring 24, or other suitable means with the adjacent end of the chain. The outer end of the transverse lever 19 is provided with an operating arm 25 for enabling the brake to be applied from the side of the vehicle at the rear portion thereof. A chain 26, which is connected with the operating arm 25, is adapted to engage a suitable projection 27 for holding the brake shoes against the wheels, when the brake is applied through the operation of the side lever 25. The split ring 24 enables the chain to be shortened a link to shorten the connections between the brake beam and the operating means for taking up the wear on the brake shoe, when desired. The chain is provided at the opposite side of the vehicle with two branches 28 and 29, which extend, respectively, to the rock shaft 20 and the brake lever 21. The rock shaft 20 is mounted in spaced bearing brackets 30, and is provided at its inner end with a short arm, which is connected with the branch 28 of the chain by a split ring 31, or other suitable means, and the outer end of the rock shaft 20 is provided with a short arm 32, designed to be connected by a rod 33, or other suitable means with a front operating lever (not shown). Also the short outer arm 32 may be connected with any other suitable operating mechanism for enabling the brake to be applied from the top of a load, or any other point.

The rear operating lever extends rearwardly from the back of the running gear, and is provided at its inner or front end with a segmental head 34, which is pivoted by a bolt 35 to a bracket 36, having a toothed segment 37, adapted to be engaged by a spring actuated dog or detent 38 of the rear lever 21 for locking the latter. The rear lever is equipped at its grip or handle portion with a latch lever 39, connected with the dog or detent for disengaging the same from the toothed segment. The branch 29 of the chain extends through an opening 40 of the rear bolster, and the segmental head and the pulley are provided with peripheral side flanges, and they are grooved between the same to receive the links, which are arranged edgewise with relation to the peripheral chain-receiving faces of the pulley and the head of the lever. This construction permits the other links to lie flat against the pulley and the head of the lever and prevents undue strain on any of the links of the chain. When the brake is applied through either of the transverse rock shafts or the rear lever, the chain at one side of the pulley is held at a fixed point, and the pulley is caused to move rearward with the brake beam. This results in an easy application of the brake, as the brake shoes are applied to the hind wheels with increased force. Also the flexible chain connection between the brake beam and the operating means enables the brake to be readily applied to various wagons of a standard gage without any alteration or change other than the mere shortening or lengthening of the chains to correspond to the distance between the pulleys and the operating devices, and the cutting and welding of the rods, which require a skilled mechanic, are eliminated.

Having thus fully described my invention, what I claim as new and desire to secure by Letters Patent, is:

1. A brake of the class described including a brake beam slidable backwardly and forwardly, a pulley carried by the brake beam and located in rear of the same, spaced transverse rock shafts located in rear of the pulley, a rear operating lever, and a chain passing around the pulley and having portions extending to the rock shafts and to the operating lever, whereby when the brake is applied at either side of the pulley the chain at the other side will be held fast.

2. A brake of the class described including a transversely disposed guide frame provided at the back with a guide, a brake beam slidable in the guide frame, a bracket extending through the said guide and secured to and carried by the brake beam, a pulley supported by the bracket and located in rear of the guide frame, spaced operating means arranged in rear of the guide frame and located at opposite sides of the vehicle, a centrally arranged rear operating device, and a flexible connection passing around the front of the pulley and extending to the spaced operating means and having a branch or portion connected with the rear operating device.

3. A brake of the class described including a transversely disposed guide frame provided at the back with a guide, a brake beam slidable in the guide frame, a bracket extending through the said guide and secured to and carried by the brake beam, a pulley supported by the bracket and located in rear of the guide frame, spaced transverse rock shafts located in rear of the pulleys, a rear operating lever, and a chain passing around the pulley and connected at one side thereof with one of the transverse shafts and provided at the opposite side with two branches connected, respectively, with the other operating shaft and with the rear operating lever.

4. A brake of the class described including a transverse guide frame, a brake beam slidable in the guide frame, a spring bearing against the brake beam, a pulley connected with the brake beam, a flexible connection passing around the pulley, and three operating devices connected with the flexible connection in rear of the pulley, two of the devices being disposed at opposite sides of the brake and one centrally of the same at the back thereof for applying the brake.

In testimony, that I claim the foregoing as my own, I have hereunto affixed my signature in the presence of two witnesses.

RANDOLPH N. MARTZ.

Witnesses:
 THOMAS A. CHAPLINE,
 J. MARSHALL MILLER.